(12) United States Patent
Lee et al.

(10) Patent No.: US 11,356,815 B2
(45) Date of Patent: Jun. 7, 2022

(54) METHOD FOR RECEIVING MBMS SERVICE AND DEVICE FOR SUPPORTING SAME

(71) Applicant: LG Electronics Inc., Seoul (KR)

(72) Inventors: Youngdae Lee, Seoul (KR); Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 127 days.

(21) Appl. No.: 16/312,934

(22) PCT Filed: Jun. 22, 2017

(86) PCT No.: PCT/KR2017/006592
§ 371 (c)(1),
(2) Date: Dec. 21, 2018

(87) PCT Pub. No.: WO2017/222322
PCT Pub. Date: Dec. 28, 2007

(65) Prior Publication Data
US 2019/0327582 A1    Oct. 24, 2019

Related U.S. Application Data

(60) Provisional application No. 62/354,098, filed on Jun. 23, 2016.

(51) Int. Cl.
*H04W 4/06*    (2009.01)
*H04W 72/04*    (2009.01)
(Continued)

(52) U.S. Cl.
CPC ............. *H04W 4/06* (2013.01); *H04L 5/0007* (2013.01); *H04L 5/26* (2013.01); *H04L 12/189* (2013.01);
(Continued)

(58) Field of Classification Search
CPC . H04W 4/06; H04W 72/042; H04W 72/0446; H04W 72/0453; H04W 76/27;
(Continued)

(56) References Cited

U.S. PATENT DOCUMENTS

2011/0275363 A1\* 11/2011 Kwon ....................... H04L 5/00
455/422.1
2013/0242738 A1    9/2013 Chang
(Continued)

FOREIGN PATENT DOCUMENTS

WO    WO2012/116219    8/2012
WO    WO2016/068528    5/2016

OTHER PUBLICATIONS

J. F. Monserrat, J. Calabuig, A. Fernandez-Aguilella and D. Gomez-Barquero, "Joint Delivery of Unicast and E-MBMS Services in LTE Networks," in IEEE Transactions on Broadcasting, vol. 58, No. 2, pp. 157-167, Jun. 2012. (Year: 2012).\*
(Continued)

*Primary Examiner* — Joshua Kading
(74) *Attorney, Agent, or Firm* — Fish & Richardson P.C.

(57) ABSTRACT

Provided are a method by which a terminal receives an MBMS service in a wireless communication system and a device for supporting the same. The terminal receives an MBMS frequency type indicator for indicating a type of an MBMS frequency relating to an MBMS service to be
(Continued)

received from a network, and can receive the MBMS service through the MBMS frequency indicated by the MBMS frequency type indicator.

6 Claims, 13 Drawing Sheets

(51) Int. Cl.
*H04L 12/18* (2006.01)
*H04W 76/27* (2018.01)
*H04L 5/26* (2006.01)
*H04L 65/611* (2022.01)
*H04L 5/00* (2006.01)
*H04W 8/08* (2009.01)

(52) U.S. Cl.
CPC .... *H04L 29/06455* (2013.01); *H04L 65/4076* (2013.01); *H04W 8/08* (2013.01); *H04W 72/042* (2013.01); *H04W 72/0446* (2013.01); *H04W 72/0453* (2013.01); *H04W 76/27* (2018.02)

(58) Field of Classification Search
CPC .......... H04W 8/08; H04L 12/189; H04L 5/26; H04L 5/0007; H04L 29/06455; H04L 65/4076; H04L 2012/5642; H04L 47/806; H04L 49/201; H04L 61/2069
See application file for complete search history.

(56) References Cited

U.S. PATENT DOCUMENTS

| 2014/0105095 | A1* | 4/2014 | Lee | H04W 36/0007 370/312 |
| 2014/0161020 | A1 | 6/2014 | Jung et al. | |
| 2015/0071160 | A1* | 3/2015 | Zeng | H04W 24/10 370/312 |
| 2015/0334637 | A1 | 11/2015 | Kim et al. | |
| 2015/0381378 | A1 | 12/2015 | Zhang et al. | |
| 2016/0014571 | A1* | 1/2016 | Lee | H04W 4/06 370/312 |
| 2016/0261394 | A1* | 9/2016 | Kazmi | H04L 5/0058 |
| 2016/0337876 | A1* | 11/2016 | Ostrup | H04W 4/06 |
| 2017/0164407 | A1* | 6/2017 | Yang | H04W 48/16 |
| 2017/0280303 | A1* | 9/2017 | Sang | H04W 72/005 |
| 2017/0290014 | A1* | 10/2017 | Kim | H04W 4/06 |
| 2017/0310718 | A1 | 10/2017 | Kim et al. | |
| 2017/0339606 | A1* | 11/2017 | Kim | H04W 36/22 |
| 2018/0263074 | A1* | 9/2018 | Wang | H04W 36/0007 |
| 2018/0310056 | A1* | 10/2018 | Matute Arribas | H04L 67/22 |

OTHER PUBLICATIONS

Lenovo, "General discussion on eMBMS enhancements," 'R1-162736', 3GPP TSG RAN WG1 Meeting #84bis, Busan, Korea, Apr. 11-15, 2016, 6 pages.
EP Supplementary Search Report in European Application No. EP 17815735, dated Dec. 16, 2019, 11 pages.

* cited by examiner

MBMS GW: MBMS gateway
MCE: multi-cell/multicast coordination entity

M1: user plane interface
M2: control plane interface inE-URTAN
M3: control plane interface between E-URTAN and EPC

METHOD FOR RECEIVING MBMS SERVICE AND DEVICE FOR SUPPORTING SAME

CROSS-REFERENCE TO RELATED APPLICATIONS

This application is a National Stage application under 35 U.S.C. § 371 of International Application No. PCT/KR2017/006592, filed on Jun. 22, 2017, which claims the benefit of U.S. Provisional Application No. 62/354,098, filed on Jun. 23, 2016. The disclosures of the prior applications are incorporated by reference in their entirety.

BACKGROUND OF THE INVENTION

Field of the Invention

The present invention relates to a technology for providing continuity of an MBMS service by identifying the type of an MBMS frequency supported by a UE in receiving an MBMS service.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas. In recent years, there is an ongoing discussion on 3GPP LTE-advanced (LTE-A) that is an evolution of the 3GPP LTE.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE can provide a multimedia broadcast multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

Research is being conducted on improved methods for efficiently utilizing resources used for an MBMS service. In this case, however, a UE supporting legacy MBMS may not be able to support an improved new MBMS technology. Accordingly, the UE needs to continuously receive an MBMS service by identifying legacy MBMS and new-type MBMS.

SUMMARY OF THE INVENTION

3GPP Release 14 specifies FeMBMS. For FeMBMS, subframes 4 and/or 9 among the subframes (0 to 9) of a radio frame are specified to be added as MSFN subframes. Therefore, a UE configured to support only existing MBMS may not support FeMBMS. That is, the UE not supporting FeMBMS cannot normally receive an MBMS service unless a frequency used only for FeMBMS is excluded in selecting an MBMS frequency of interest, in which case the UE cannot maintain continuity of the MBMS service. Accordingly, it is required to develop a technology that enables a UE supporting only conventional MBMS to maintain continuity of an MBMS service.

According to one embodiment, there is provided a method for providing, by a UE, continuity of an MBMS service, the method including: receiving an MBMS frequency type indicator indicating a type of an MBMS frequency related to an MBMS service of interest from a network; and receiving the MBMS service of interest via the MBMS frequency which is indicated by the MBMS frequency type indicator.

The MBMS frequency type indicator may indicate whether the MBMS frequency is an FeMBMS frequency.

The receiving of the MBMS service may include receiving the MBMS service through the MBMS frequency on an MBMS cell corresponding to the MBMS frequency type indicator.

The MBMS cell may be an MBMS/unicast-mixed cell.

The MBMS/unicast-mixed cell may be an MBMS cell performing MBSFN transmission or unicast transmission through one of more of subframes 1, 2, 3, 6, 7, and 8 in a downlink radio frame.

The MBMS cell may be an FeMBMS/unicast-mixed cell.

The FeMBMS/unicast-mixed cell may be an MBMS cell performing MBSFN transmission or unicast transmission through one of more of subframes 1, 2, 3, 4, 6, 7, 8, and 9 in a downlink radio frame.

In the FeMBMS/unicast-mixed cell, it may be indicated whether each of the subframes is used for MBSFN transmission or for unicast transmission.

The MBMS cell may be an MBMS-dedicated cell.

In the MBMS-dedicated cell, any subframe in a downlink radio frame may be allocated only for MBSFN transmission.

The method may further include determining whether the MBMS frequency indicated by the received MBMS frequency type indicator is supported by the UE after the receiving of the MBMS frequency type indicator.

The receiving of the MBMS service may include receiving the MBMS service through the MBMS frequency when the MBMS frequency is supported by the UE.

The MBMS frequency type indicator may be received through SIB15.

According to another embodiment, there is provided a UE receiving an MBMS service in a wireless communication system, the UE including: a memory; a transceiver; and a processor to connect the memory and the transceiver, wherein the processor is configured to: receive an MBMS frequency type indicator indicating a type of an MBMS frequency related to an MBMS service of interest from a network; and receive the MBMS service of interest via the MBMS frequency which is indicated by the MBMS frequency type indicator The MBMS frequency type indicator may indicate whether the MBMS frequency is an FeMBMS frequency.

According to embodiments of the present invention, a UE supporting only existing MBMS can continuously receive an MBMS service even when a new type of MBMS service is provided.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
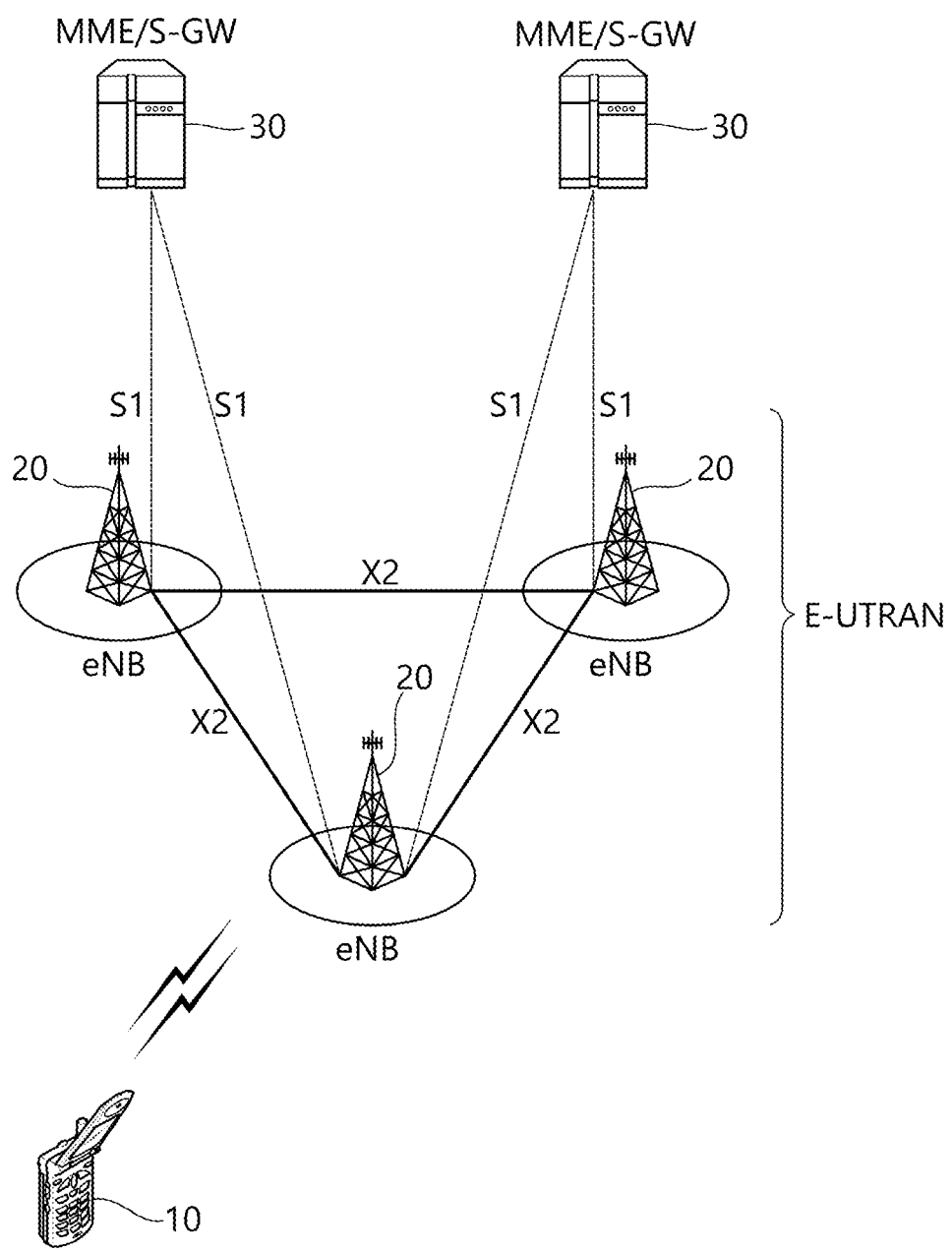
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
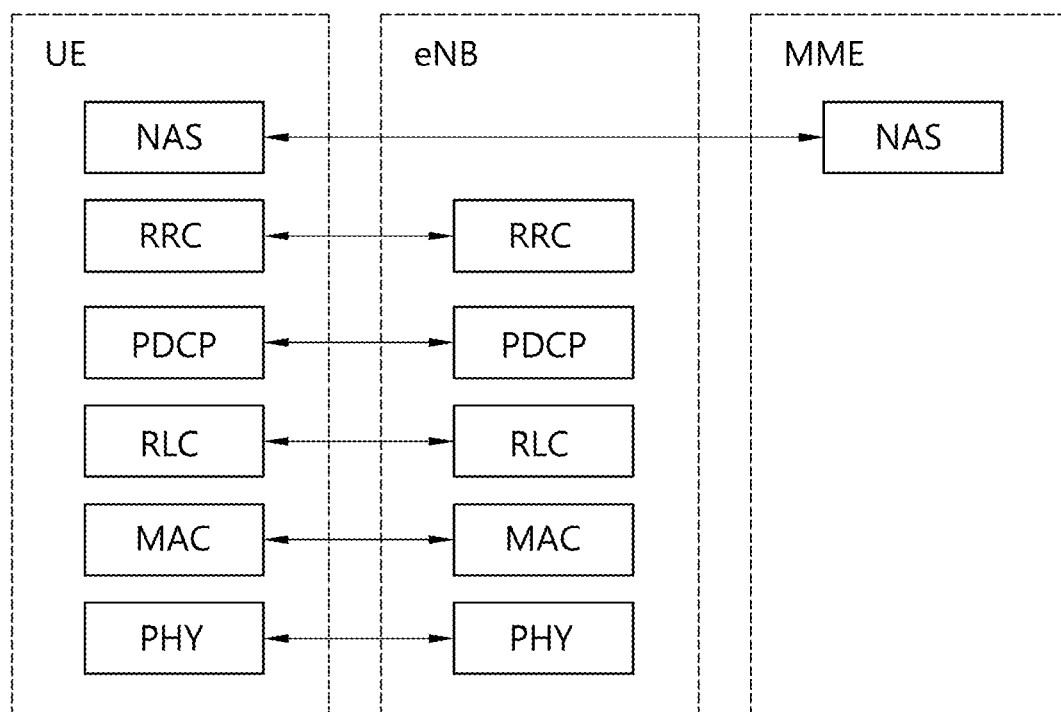
FIG. 2 shows a block diagram of a control plane protocol stack of an LTE system.
Figure 3:
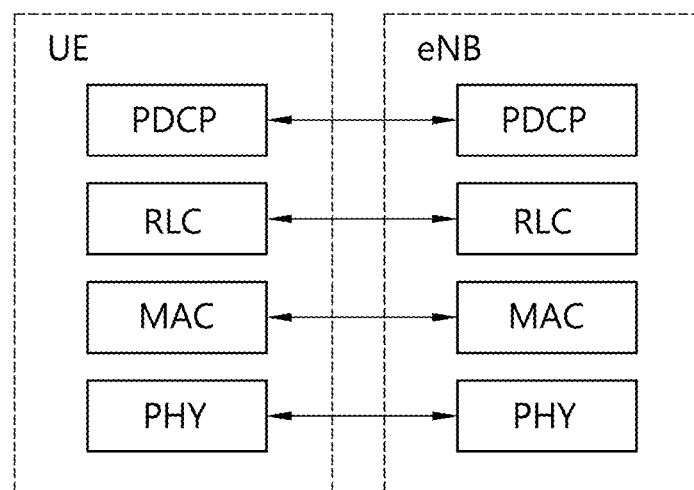
FIG. 3 shows a block diagram of a user plane protocol stack of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, RRC state of UE and RRC connection method is described below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

A non-access stratum (NAS) layer located above the RRC layer performs the function of session management and mobility management.

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

Figure 4:
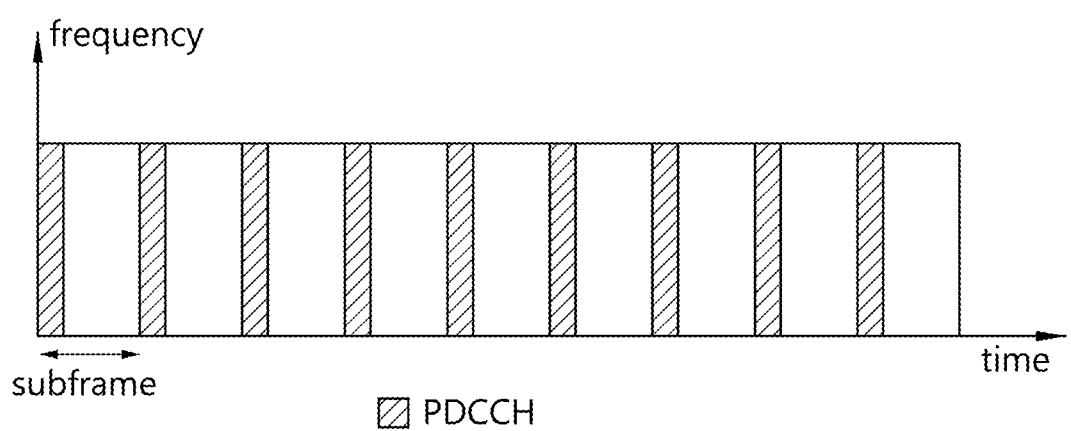
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Multimedia broadcast multicast services (MBMS) are described.

Figure 5:
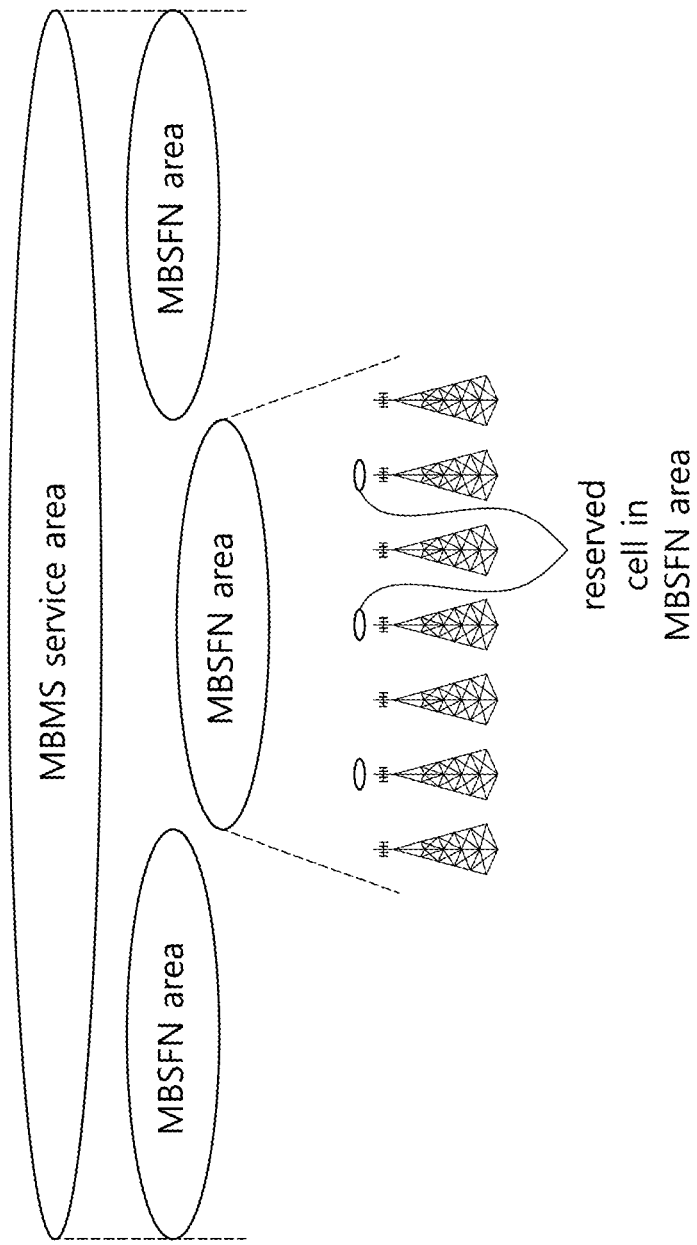
FIG. 5 shows MBMS definitions.

FIG. 5 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

SIB13 includes information required to obtain MBMS control information related to one or more MBSFN areas. Table 1 illustrates elements included in SIB 13.

TABLE 1

```
-- ASN1START
SystemInformationBlockType13-r9 ::=        SEQUENCE {
    mbsfn-AreaInfoList-r9                      MBSFN-AreaInfoList-r9,
    notificationConfig-r9                      MBMS-NotificationConfig-r9,
    lateNonCriticalExtension                   OCTET STRING    OPTIONAL,
    ...
}
-- ASN1STOP
```

In Table 1, notificationConfig indicates an MBMS notification related with a configuration parameter. When dl-Bandwidth included in MasterInformationBlock is set to n6, a UE may disregard this field.

Further, SIB15 includes the MBMS service area identity (SAI) of a current and/or a neighboring carrier frequency. Table 2 illustrates elements included in SIB 15.

TABLE 2

```
-- ASN1START
    SystemInformationBlockType15-r11 ::=    SEQUENCE {
        mbms-SAI-IntraFreq-r11                  MBMS-SAI-List-r11              OPTIONAL,       -- Need OR
        mbms-SAI-InterFreqList-r11              MBMS-SAI-InterFreqList-r11     OPTIONAL,       -- Need OR
        lateNonCriticalExtension                OCTET STRING                              OPTIONAL,
        ....,
        [[ mbms-SAI-InterFreqList-v1140         MBMS-SAI-InterFreqList-v1140   OPTIONAL        -- Cond
InterFreq
        ]]
}
MBMS-SAI-List-r11 ::=                       SEQUENCE (SIZE (1..maxSAI-MBMS-r11)) OF MBMS-SAI-r11
MBMS-SAI-r11 ::=                            INTEGER (0..65535)
MBMS-SAI-InterFreqList-r11 ::=              SEQUENCE (SIZE (1..maxFreq)) OF MBMS-SAI-InterFreq-r11
MBMS-SAI-InterFreqList-v1140 ::=            SEQUENCE (SIZE (1..maxFreq)) OF MBMS-SAI-InterFreq-v1140
MBMS-SAI-InterFreq-r11 ::=                  SEQUENCE {
    dl-CarrierFreq-r11                          ARFCN-ValueEUTRA-r9,
    mbms-SAI-List-r11                           MBMS-SAI-List-r11
}
MBMS-SAI-InterFreq-v1140 ::=                SEQUENCE {
    multiBandInfoList-r11                       MultiBandInfoList-r11          OPTIONAL        --
Need OR
}
-- ASN1STOP
```

In Table 2, a sai-IntraFreq field includes a list of MBMS SAIs for a carrier frequency to which the UE is currently connected. A sai-InterFreqList field includes a list of neighboring frequencies providing an MBMS service and a list of MBMS SAIs corresponding thereto. A sai-List field includes a list of MBMS SAIs for a particular frequency.

An MBMS service may be provided to a UE through a radio frame. The radio frame may be a radio frequency division duplexing (FDD) frame and may include ten subframes. In a radio frame structure, one radio frame (e.g., a radio frame has a length of 10 ms) includes a total of ten subframes (e.g., each subframe has a length of 1 ms), and uses for some of the subframes are specified. In particular, uses for 0th, 4th, 5th, and 9th subframes are specified, which are described as follows.

The 0th and 5th subframes (respectively indicated by subframe 0 and subframe 5 in FIG. 1) are configured to transmit a primary synchronization channel (PSCH) and a secondary synchronization channel (SSCH) for a synchronization signal. Further, the 0th subframe is configured to transmit a physical broadcast channel (PBCH) in addition to the synchronization signal. That is, in the system, the 0th subframe is configured to transmit the SSCH, the PSCH, and the PBCH, and the 5th subframe is configured to transmit the SSCH and the PSCH. The fourth subframe (indicated by subframe 4 in FIG. 1) is configured to transmit information of a system information block (SIB), and the ninth subframe (indicated by subframe 9 in FIG. 1) is defined as a special subframe for unicast. Accordingly, according to a conventional technique, an MBMS subframe includes 1st, 2nd, 3rd, 6th, 7th, and 8th subframes excluding 0th, 4th, 5th, and 9th subframes.

Generally, control information on UEs supporting MBMS is separated from unicast control information as much as possible. Most of the MBMS control information is provided on MBMS common control information, that is, an MCCH-specific logical channel. E-UTRA uses one MCCH logical channel for each MBSFN area. When a network includes a plurality of MBSFN areas, a UE acquires MBMS control information via an MCCH configured to identify whether a service to be received is operating. The UE supporting MBMS is required to support receiving only one MBMS service at a time. The MCCH carries an MBSFNAreaConfiguration message, which indicates not only an ongoing MBMS session but also a (corresponding) radio resource configuration. The MCCH may also carry an MBMSCountingRequest message when the E-UTRAN wishes to count the number of UEs in the RRC_CONNECTED state that receive or wish to receive one or more particular MBMS services.

A limited amount of MBMS control information is provided on a BCCH. This is mainly related to information needed to acquire an MCCH(s). This information is carried by single MBMS-specific SystemInformationBlock, that is, SystemInformationBlockType13. The MBSFN area can be identified only by mbsfn-AreaId of SystemInformationBlockType13. Regarding mobility, the UE considers that the MBSFN areas are contiguous when a source cell and a target cell broadcast the same value via mbsfn-AreaId.

MCCH information is periodically transmitted using a configurable repetition period. No scheduling information is provided for the MCCH. That is, not only time-domain scheduling but also a lower-layer configuration is semi-statically established as defined in SystemInformationBlockType13.

For MBMS user data carried by an MTCH logical channel, the E-UTRAN periodically provides MCH scheduling information (MSI) in a lower layer (MAC). The MCH information is related only to time-domain scheduling, that is, frequency-domain scheduling and a lower-layer configuration are semi-statically established. A period for the MSI may be set and defined based on an MCH scheduling interval.

A change in MCCH information occurs only in a particular radio frame. That is, the concept of a modification period is used. Within the modification period, the same MCCH information may be transmitted as many times as defined based on scheduling (repetition period) thereof. The boundary of the modification period is defined by a system frame number (SFN) value satisfying SFN mod m=0, where m is the number of radio frames including the modification period. The modification period is configured using SystemInformationBlockType13.

Figure 6:
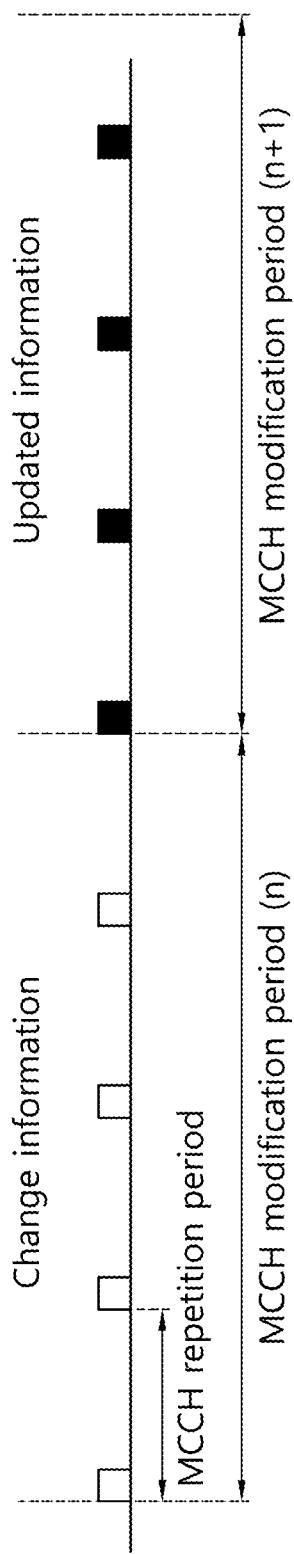
FIG. 6 illustrates an example of a change in MCCH information.

FIG. 6 illustrates an example of a change in MCCH information.

When a network (partly) changes MCCH information, a UE notifies UEs of the change during a first modification period. In the next modification period, the network transmits updated MCCH information. In FIG. 6, different colors represent different pieces of MCCH information. Upon receiving a notification of the change, a UE desiring to receive an MBMS service immediately acquires new MCCH information when the next modification period starts. The UE applies previously acquired MCCH information until acquiring the new MCCH information.

The indication of an M-RNTI, which is an MBMS-specific RNTI, on a PDCCH is used to report an MCCH information change to UEs in the RRC_IDLE state and UEs in the RRC_CONNECTED state. Upon receiving a notification of the MCCH information change, the UE can know that MCCH information will be changed at the boundary of the next modification period. A notification of the PDCCH indicates which MCCH is to be changed, which is achieved using an eight-bit bitmap. In this bitmap, a bit at a position indicated by a notificationIndicator field is used to indicate a change in a corresponding MBSFN area. When the bit is set to 1, a corresponding MCCH is changed. No additional details are provided. Information indicating which MCCH information is changed, that is, the notification of the MCCH information change, is used to notify the UE of a change in MCCH information when a session starts or when MBMS counting starts.

The notification of the MCCH information change on the PDCCH is periodically transmitted and is transported back only in an MBSFN subframe. The notification of the MCCH information change is applied to all MCCHs that can be configured with parameters (repetition factor, radio frame offset, and subframe index) configured and included in SystemInformationBlockType13. This common notification is based on an MCCH having the shortest modification period.

The E-UTRAN may update MBMS configuration information carried via a BCCH, that is, may change the MBMS configuration information provided on an MCCH in corresponding BCCH and MCCH modification periods. When detecting that a new MCCH is configured on a BCCH and recognizing that a service of interest is not provided in an MBSFN are, a UE desiring to receive one or more MBMS services needs to acquire the MCCH.

A UE that is receiving an MBMS service needs to acquire MCCH information when each modification period starts. When the notification of the MCCH information change is not received, not only a UE that does not receive an MBMS service but is likely to receive another service which is not yet started in another MBSFN area but also a UE that does not receive an MBMS service are not able to receive the applicable MCCH (s) may attempt to find the notification of the MCCH information change at least notificationRepetitionCoeff times during the modification period of an applicable MCCH(s), thereby proving that stored MCCH information is valid.

When the UE recognizes which MCCH(s) the E-UTRAN uses for a service(s) that the UE wishes to receive, the UE only needs to monitor a notification of a change in subset of MCCHs configured as applicable MCCH(s).

Figure 7:
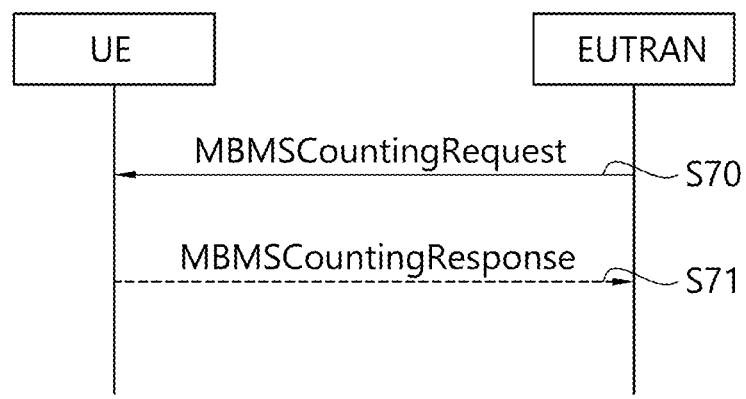
FIG. 7 illustrates a procedure for acquiring MCCH information.

FIG. 7 illustrates a procedure for acquiring MCCH information.

A UE acquires MBMS control information broadcasted by an E-UTRAN by applying a procedure for acquiring MCCH information. This procedure is applies to MBMS-supporting UEs in the RRC_IDLE or RRC_CONNECTED state. When a UE desiring to receive an MBMS service enters a corresponding MBSFN area (e.g., when the UE is powered on according to mobility) and receives a notification of a change in MCCH information, the UE needs to apply a procedure for acquiring MCCH information. A UE receiving an MBMS service applies a procedure for acquiring MCCH information to acquire an MCCH and corresponds to a service received at the start of each modification period.

Unless specified otherwise in a procedural specification, a procedure for acquiring MCCH information overwrites stored MCCH information. That is, a delta configuration is not applicable to the MCCH information, and a UE stops using a field when there is no field in the MCCH information unless explicitly specified otherwise.

An MBMS-supporting UE:
1> When the procedure is triggered by an MCCH information change notification;
2> the UE starts to acquire an MBSFNAreaConfiguration message (step S70) and an MBMSCountingRequest message (if present) when a modification period starts after receiving the change notification;
1> when the UE enters an MBSFN area:
2> the UE acquires an MBSFNAreaConfiguration message (step S70) and an MBMSCountingRequest message (if present) in the next repetition period (step S71).
When the UE is receiving an MBMS service,
2> the UE starts to acquire an MBSFNAreaConfiguration message (step S70) and an MBMSCountingRequest message, if present, (step S71) related to the MBSFN area of the service being received when each modification period starts.

In the E-UTRAN, MBMS may provide a single-frequency network operation mode (MBSFN) only through a frequency layer shared with non-MBMS services (a set of cells supporting both unicast and MBMS transmissions, i.e. a set of MBMS/unicast-mixed cells).

MBMS reception is possible for UEs in the RRC_CONNECTED or RRC_IDLE state. Whenever receiving MBMS services, a user may be notified of an incoming call, and generated calls may be possible. Robust header compression (ROHC) is not supported for MBMS.

Figure 8:
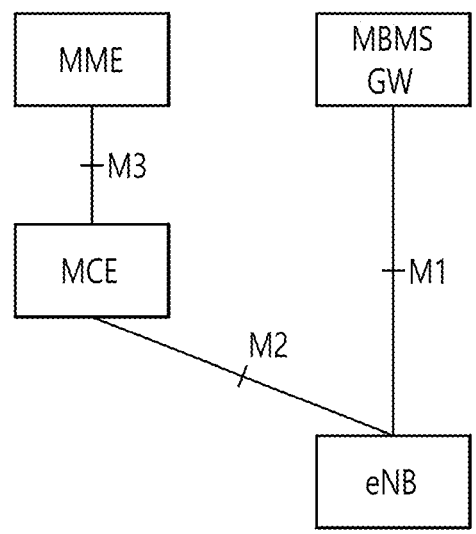
FIG. 8 illustrates an enhanced MBSM (E-MBMS) logical structure.

FIG. 8 illustrates an enhanced MBSM (E-MBMS) logical structure. 3GPP LTE can support MBMS, and 3GPP LTE-A can support E-MBMS.

Referring to FIG. 8, an MCE is connected with an eNB via an M2 interface, and is connected with an MME through an M3 interface. The MCE is a logical entity. The MCE may be part of another network element. The MCE have the following functions.

To grant and allocate radio resources used by all eNBs in an MBSFN region for multi-cell MBMS transmissions using an MBSFN operation. When radio resources are not enough for a corresponding MBMS service(s) or the MCE can preempt radio resources from other radio bearer(s) for an ongoing MBMS service(s) according to allocation and retention priority (ARP), the MCE determined not to establish a radio bearer(s) for a new MBMS service(s). In addition to the function of allocating time/frequency radio resources, the MCE also has a function of determining a radio configuration, for example, additional details of a modulation and coding scheme.

To count an MBMS service(s) and to obtain the counting results.

For example, to resume an MBMS session(s) in an MBSFN area(s) based on the ARP of a corresponding MBMS service(s) and/or the counting results.

For example, to stop an MBMS session(s) in an MBSFN area(s) based on the ARP of a corresponding MBMS service(s) and/or the counting results.

The MCE is involved in MBMS session control signaling. The MCE does not perform UE-MCE signaling. The eNB is served by a single MCE.

An MBMS GW is a logical entity. The MBMS GW may be part of another network element. The MBMS GW exists between eNBs and a BMSC and has a main function of transmitting/broadcasting MBMS packets to each eNB that transmits a service. The MBMS GW uses IP multicast as a method for transmitting MBMS user data to the eNB. The MBMS GW performs MBMS session control signaling (connection start/update/stop) to an E-UTRAN through the MME.

The M3 interface is a control plane interface connecting the MCE and the MME. An application part is defined for this interface between the MME and the MCE. This application part enables MBMS session control signaling on an E-UTRAN radio access bearer (E-RAB) level (i.e. does not transport back radio configuration data). This procedure includes, for example, MBMS session start and stop. A stream control transmission protocol (SCTP) is used as a signaling transmitter, that is, point-to-point signaling is applied.

The M2 interface is a control plane interface connecting the MCE and the eNB. An application part is defined for this interface to transport back at least radio configuration data for eNBs in multi-cell transmission mode and connection control signaling. The SCTP is used as a signaling transmitter, that is, point-to-point signaling is applied.

An M1 interface is a pure user plane interface connecting the MBMS GW and the eNB. Thus, no control plane application part is defined for this interface. IP multicast is used for point-to-multipoint transmission of user packets.

An MBMS interest indication is described. This procedure is intended for a UE to notify an E-UTRAN that the UE is interested to receive or is receiving MBMS through an MBMS radio bearer (MRB) and then notify the E-UTRAN of priority information on the MBMS for unicast reception.

Figure 9:
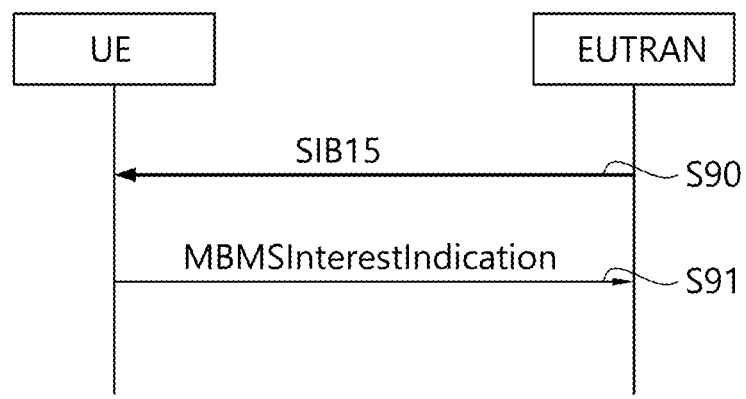
FIG. 9 illustrates an MBMS interest indication procedure.

FIG. 9 illustrates an MBMS interest indication procedure. A UE capable of MBMS in RRC_CONNECTED may initiate the procedure in some cases, for example, when successfully establishing a connection, when entering or leaving a service area, when starting or stopping a connection, when interest is changed, when a priority is changed between MBMS reception and unicast reception, and when a primary cell (PCell) broadcasting SystemInformationBlockType15 is changed.

When the procedure is initiated, the UE performs the following operations.

1> When SystemInformationBlockType15 is broadcast by the PCell in step S90;

2> the UE identifies that the UE has a valid version of SystemInformationBlockType15 for the PCell;

2> if the UE does not transmit an MBMSInterestIndication message after last entering RRC_CONNECTED; or 2> if the UE transmits an MBMSInterestIndication message after the last time, the UE is connected to a PCell that has not broadcast SystemInformationBlockType15;

3> if a set of MBMS frequencies of interest is not empty:

4> the UE initiates the transmission of an MBMSInterestIndication message;

2> further:

3> if the set of MBMS frequencies of interest are changed after the last transmission of the MBMSInterestIndication message; or 3> if reception at all indicated MBMS frequencies is prior to reception at any of the established unicast bearers after the last transmission of the MBMSInterestIndication message:

4) the UE initiates the transmission of an MBMSInterestIndication message.

The UE can transmit an MBMSInterestIndication message even when the UE is able to receive MBMS services of interest in order to prevent the network from allocating MBMS reception block settings.

To determine MBMS frequencies of interest, the UE operates as follows.

1> The UE considers one frequency as part of the MBMS frequencies of interest if the following conditions are satisfied.

2> Where a session for at least one MBMS that the UE is receiving or is interested in receiving through an MRB is ongoing or is about to start (the UE can determine whether the session is ongoing based on start and stop times indicated in a user service description (USD)); and 2> where SystemInformationBlockType15 obtained from the PCell includes, for at least one of these MBMS sessions, one or more MBMS service area identifiers (SAIs), indicated in a USD of the session, for a frequency of interest (the UE can consider the frequency as a part of the MBMS frequencies of interest even though the E-UTRAN cannot (temporarily) use an MRB for the session of interest. That is, the UE does not confirm whether the session is displayed on an MCCH: and 2> where the UE is able to simultaneously receive the set of $BMS_{[n]}$ frequencies of interest regardless of whether a serving cell is set for each of these frequencies; and 2> where supportedBandCombincation included by the UE in UE-EUTRA-Capability includes at least one band combination including the set of MBMS frequencies of interest.

Indicating a frequency means that the UE supports obtaining SystemInformationBlockType13 for a frequency of interest, that is, this indication needs to be independent of whether a serving cell is set on that frequency. When evaluating which frequencies that the UE can use for simultaneous reception, the UE does not consider currently set service frequencies, that is, the UE considers only MBMS frequencies which the UE desires to use for reception. The term "frequency" does not refer to a physical frequency but covers a relevant band(s), which means that additional bands may be indicated via SystemInformationBlockType1 (service frequency) or SystemInformationBlockType15 (neighboring frequencies).

The UE may set the contents of the MBMSInterestIndication message as follows.

1> When the set of MBMS frequencies of interest is empty:

2> the UE includes mbms-FreqList, and, if applicable, sets mbms-FreqList to include the MBMS frequencies of interest using an E-UTRA absolute radio frequency channel number (EARFCN) corresponding to freqBandIndicator included in SystemInformationBlockType1 and an EARFCN(s) included in SystemInformationBlockType15. mbms-FreqList indicates only physical frequencies that the UE desires for reception but does not indicate that the UE supports the relevant band.

2> When the UE prefers reception at all indicated MBMS frequencies to reception at any of the unicast bearers, the UE includes mbms-Priority. When the UE prioritizes MBMS reception and unicast data cannot be supported due to congestion on an MBMS carrier(s), the E-UTRAN may initiate release of the unicast bearers. The E-UTRAN may release all the bearers or may release only GBR bearers depending on implementation. Even though congestion is relieved, the E-UTRAN does not initiate re-establishing released unicast bearers.

The UE may transmit an MBMSInterestIndication message to lower layers to which transmission is directed. Accordingly, in step S91, the UE transmits the MBMSInterestIndication message to the E-UTRAN.

An MBMS counting procedure is described. In the MBMS counting procedure, the E-UTRAN counts the number of UEs in the RRC_CONNECTED mode that are receiving or wish to receive MRB-specific MBMS services through an MRB. The UE determines interest in an MBMS service identified by a temporary mobile group identifier (TMGI) through interaction with higher layers.

Figure 10:
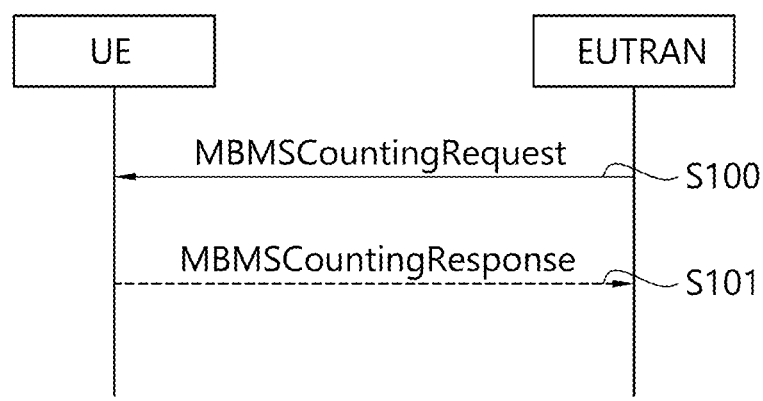
FIG. 10 illustrates an MBMS counting procedure.

FIG. 10 illustrates an MBMS counting procedure. In step S100, an E-UTRAN initiates this procedure by transmitting an MBMSCountingRequest message to a UE. Upon receiving the MBMSCountingRequest message, the UE in RRC_CONNECTED may operate as follows.

1> When SystemInformationBlockType1 that provides scheduling information on systemInformationBlockType13 including an MCCH configuration, through which the MBMSCountingRequest message is received, includes the ID of a registered PLMN: and 1> when the UE is receiving or desires to receive at least one of the services in received CountingRequestList through an MRB;

2> if two or more entries are included in mbsfn-AreaInfoList received within SystemInformationBlockType13 including the MCCH configuration, through which the MBMSCountingRequest message is received:

3> the UE includes mbsfn-AreaIndex in an MBMSCountingResponse message and sets mbsfn-AreaIndex to an index of an entry in the mbsfn-AreaInfoList in the received SystemInformationBlockType13 corresponding to an MBSFN area used for transmitting the received MBMS-CountingRequest message;

2> for each MBMS service included in received CountingRequestList:

3> when the UE is receiving or desires to receive the MBMS service through an MRB:

4> the UE includes an entry in CountingResponseList in the MBMSCountingResponse message having CountingResponseService and sets the entry to an index of an entry in CountingRequestList in received MBMSCountingRequest corresponding to an MBMS service that the UE is receiving or is interested in receiving;

2> the UE transmits the MBMSCountingResponse message to lower layers to which transmission is directed, thereby terminating the procedure.

In this manner, in step S101, the UE may transmit an MBMSCountingResponse message to the E-UTRAN.

UEs that are receiving an MBMS user service via a unicast bearer service (i.e., via a DRB) but desires to receive an MBMS user service of interest through an MBMS bearer service (i.e., via an MRB) respond to a counting request. When encoding is used for higher layers, if a UE cannot decode an MBMS service for which counting is performed, the UE does not respond to the counting request. The UE independently handles MBMSCountingRequest messages received in each modification period. When an E-UTRAN is less likely to repeat an MBMSCountingRequest (i.e., including the same services) in a subsequent modification period, the UE responds again.

Cell reselection is described. When a UE camps on one cell, the UE remaining RRC_IDLE continuously performs cell reselection in order to find an appropriate cell according to cell reselection criteria. In this case, the UE performs frequency measurement and cell reselection using frequency priority information. That is, the UE may determine which frequency is preferentially considered when performing frequency measurement and cell reselection based on the frequency priority information. When an appropriate cell is found, this cell is selected. A cell change may imply an RAT change.

The absolute priorities of different E-UTRAN frequencies or inter-RAT frequencies may be provided to the UE via system information in an RRCConnectionRelease message or may be provided to the UE by being inherited from another RAT in inter-RAT cell (re)selection. In the case of system information, the E-UTRAN frequencies or the inter-RAT frequencies may be listed without providing the priorities (i.e., no cellReselectionPriority field exists for the corresponding frequencies). When the priorities are provided via dedicated signaling, the UE may disregard all priorities provided via system information. When the UE camps on a cell, the UE may apply only the priorities provided via system information from the current cell. Further, unless specified otherwise, the UE preserves the priorities provided via dedicated signaling and received deprioritisationReq in an RRCConnectionReject message. When a UE in a normally camping state has only dedicated priorities instead of that of the current frequency, the UE may consider the current frequency as a frequency having the lowest priority (i.e., lower than eight network-configured values). While the UE is camping on an appropriate closed subscriber group (CSG) cell, the UE may always consider the current frequency as a frequency having the highest priority (i.e., higher than the eight network-configured values) regardless of any other priority value allocated to the current frequency).

While a UE is camping on the appropriate CSG cell, the UE needs to always consider the current frequency as a frequency having the highest priority (higher than the network-configured values) regardless of any other priority value allocated to this frequency. Access can be performed within a normal range. When a UE capable of sidelink communication is configured to perform sidelink communication and can perform only sidelink communication while camping on a frequency, the UE may consider the frequency as the highest priority.

When a UE is capable of MBMS service continuity or SC-PTM reception, is receiving or is interested in receiving an MBMS service, and is capable of receiving only an MBMS service while camping on a provided frequency, the UE can consider the frequency as the highest priority during an MBMS session as long as condition 1 or condition 2 is satisfied:

Condition 1 where the UE may have MBMS service continuity and a reselected cell broadcasts SIB13 or where the UE is capable of SC-PTM reception and the reselected cell broadcasts SIB20;

Condition 2 where SIB 15 of a serving cell indicates one or more MBMS SAIs included in an MBMS user service description (USD) of this service for the frequency; or where SIB 15 is not broadcast from the serving cell and the frequency is included within the USD of this service.

When the UE is capable of MBMS service continuity or SC-PTM reception and is receiving or is interested in receiving an MBMS service provided on a downlink-dedicated MBMS frequency, the UE may consider a cell reselection candidate frequency on which MBMS cannot be received as the lowest priority during an MBMS session as long as condition 1 is satisfied on an MBMS frequency that the UE monitors and condition 2 is satisfied in the serving cell.

An illustrative scenario in which the previous priorities need to be lowered is related to the case where an MBMS frequency is a downlink-dedicated carrier where camping is impossible, whereas a UE can perform reception only on the corresponding MBMS frequency when camping on a subset of cell reselection candidate frequencies.

When the UE cannot have MBMS service continuity but has information on which frequency an MBMS service of interest is provided through, the UE may consider the frequency as the highest priority during an MBMS session as long as a reselected cell broadcasts SIB13.

When the UE cannot have MBMS service continuity but has information on which downlink-dedicated frequency an MBMS service of interest is provided through, the UE may consider a cell reselection candidate frequency, on which an MBMS service cannot be received, as the lowest priority during an MBMS session as long as a cell on an MBMS frequency monitored by the UE broadcasts SIB13.

The UE considers that an MBMS session continues using session start and end times provided by upper layers in a USD, that is, the UE does not prove whether the session is indicated on an MCCH.

When the UE receives an RRCConnectionReject message having deprioritisationReq, the UE considers a current carrier frequency and frequencies stored due to the previously received RRCConnectionReject message having deprioritisationReq or, during the execution of T325 regardless of the RAT that has remained, store the stored frequencies all EUTRA frequencies as frequencies having the lowest priority (i.e., lower than the eight network-configured values) while T325 is running regardless of camping RAT. The UE may delete stored deprioritization request(s) when PLMN selection is performed upon request by the NAS.

The UE may delete priorities provided by dedicated signaling in the following cases:
When the UE enters RRC_CONNECTED; or
When the optional period of validity of dedicated priorities (T320) expires; or
When PLMN selection is performed on request by the NAS.

The UE may perform only cell reselection evaluation on E-UTRAN frequencies and inter-RAT frequencies that are provided via system information and have priorities provided for the UE. The UE may not consider any blacklisted cells as candidates for cell reselection. The UE may inherit, if set, priorities provided by dedicated signaling and remaining valid time (i.e. T320 in E-UTRA, T322 in UTRA, and T3230 in GERAN) in =inter-RAT cell (re)selection.

FeMBMS is described. FeMBMS is further enhanced MBMS and is defined to additionally use 4th and 9th subframes among the subframes (0th to 9th) of a radio frame for MBMS transmission. That is, in FeMBMS, subframes 1, 2, 3, 4, 6, 7, 8 and 9 can be used for MBMS transmission. Accordingly, types of MBMS cells providing an MBMS service may be classified into an MBMS-dedicated cell, an MBMS/unicast-mixed cell, and an FeMBMS/unicast-mixed cells.

1) MBMS-dedicated cell: A cell that performs only MBMS transmission is referred to as an MBMS-dedicated cell. A UE that does not support FeMBMS is not supported in this cell. Paging is not supported in an MBMS-dedicated cell.

For the MBMS-dedicated cell,
an MTCH and an MCCH are mapped on an MCH for MBSFN transmission;

The MBMS-dedicated cell does not support unicast traffic in a downlink and cannot be used as a PCell or PSCell. System information necessary to receive MBMS from the MBMS-dedicated cell is broadcast on a non-MBSFN subframe. A system information change notification and an ETWS/CMAS notification are provided via an L1 signal of a non-MBSFN subframe. A PBCH of the MBMS-dedicated cell uses scrambling sequence initialization different from that for a PBCH of the MBMS/unicast-mixed cell, thereby preventing a UE not supporting FeMBMS from camping on this cell.

2) MBMS/unicast-mixed cell: A cell performing both MBMS and unicast transmissions is referred to as an MBMS/unicast-mixed cell.

For the MBMS/unicast-mixed cells,
an MTCH and an MCCH are mapped on an MCH for MBSFN transmission,
an SC-MTCH and an SC-MCCH are mapped on a DL-SCH for SC-PTM transmission, and
both unicast and MBMS transmissions in the cell are performed in a coordinated manner.

3) FeMBMS/unicast-mixed cell: The FeMBMS/unicast-mixed cell refers to an MBMS/unicast-mixed cell operating with at least one of the following:
subframe 4 or 9, or both includes MBSFN subframes;
a subframe may not include a unicast control area.

The FeMBMS/unicast-mixed cell cannot be used as a PCell or PSCell. To provide unicast traffic via a non-MBSFN subframe, this cell needs to be configured as a SCell. A UE not supporting FeMBMS is not supported in this cell and is prevented from camping using a cell barring mechanism of SIB1. A call with respect to an incoming call is not supported in this cell, and an system information change notification and an ETWS/CMAS notification are provided along with an L1 signal.

A UE configured to support only existing MBMS may not support FeMBMS. That is, a UE not supporting FeMBMS cannot normally receive an MBMS service unless a frequency used only for FeMBMS is excluded in selecting an MBMS frequency of interest. In this case, the UE cannot maintain continuity of an MBMS service. Hereinafter, a method for a UE supporting only existing MBMS to maintain continuity of an MBMS service will be described.

Figure 11:
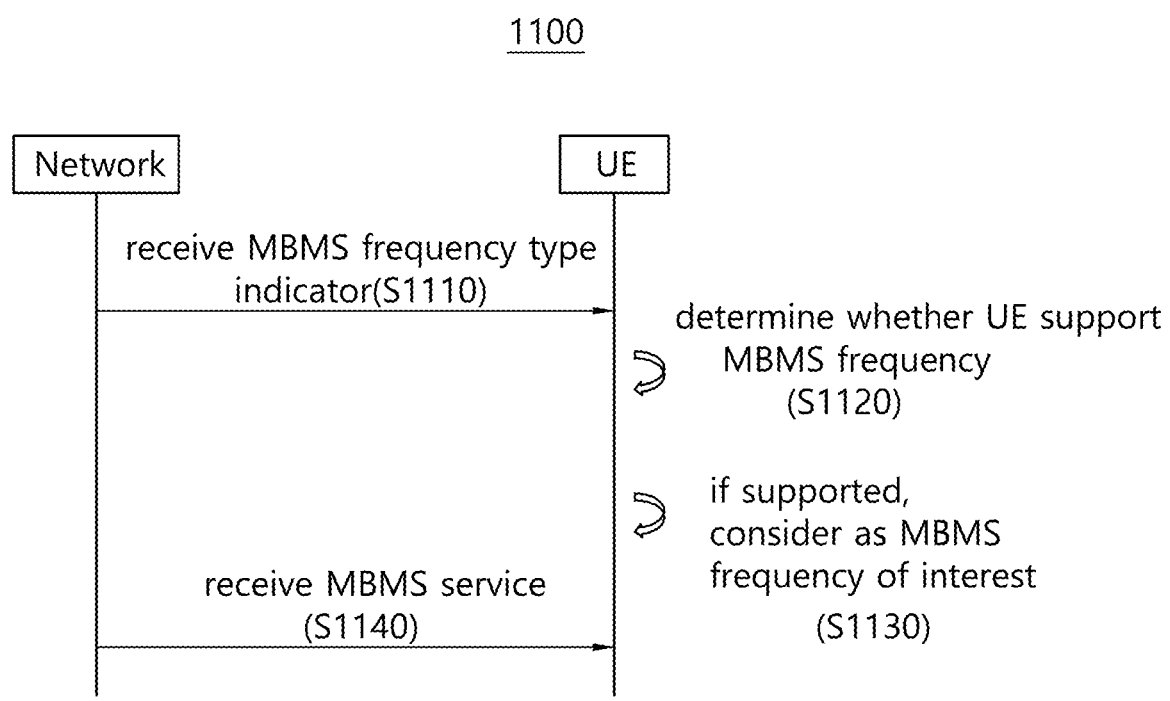
FIG. 11 is a flowchart illustrating a method for receiving an MBMS service according to an embodiment of the present invention.

FIG. 11 is a flowchart illustrating a method 1100 for receiving an MBMS service according to an embodiment of the present invention.

A UE may receive an MBMS frequency type indicator indicating the type of an MBMS frequency related to an MBMS service to be received from a network (S1110). The MBMS frequency refers to a frequency available to provide the MBMS service. According to one embodiment, the MBMS frequency type indicator may indicate whether the MBMS frequency corresponds to an FeMBMS frequency.

In addition, the type of the MBMS frequency may be associated with a combination of subframes included in a downlink radio frame. Specifically, a combination of downlink subframes for receiving the MBMS service may be determined according to the type of the MBMS frequency. Here, the radio frame may be a radio frequency division duplexing (FDD) frame and may include ten (0th to 9th) subframes. That is, the UE may acquire the type of a frequency for receiving an MBMS service of interest. According to one embodiment, the UE may receive the MBMS service through the MBMS frequency indicated by the MBMS frequency type indicator on an MBMS cell corresponding to the MBMS frequency type indicator.

The types of MBMS frequencies according to one embodiment of the present invention may be classified into a first type, a second type, and a third type. The first type may correspond to a combination of one or more subframes among subframes 1, 2, 3, 6, 7, and 8 of the ten subframes. That is, in the first type, the maximum number of MBSFN subframes used for MBSFN transmission in the radio frame may be six except for subframes 0, 4, 5, and 9 subframes among the ten subframes. An MBMS cell corresponding to the first type is an existing MBMS/unicast-mixed cell. In the MBMS/unicast-mixed cell, MBSFN transmission or unicast transmission cannot be provided over an FeMBMS frequency.

The second type may correspond to a subframe combination including subframes other than subframes 1, 2, 3, 6, 7, and 8 among the ten subframes. In the second type, a subframe which cannot be used in the first type can be additionally used. In the second type, at least one of subframes 0, 4, 5, and 9 may be used as an MBSFN subframe. In one example, in the second type, one or more of subframes 1, 2, 3, 4, 6, 7, 8, and 9 may be used as an MBSFN subframe. Frequencies corresponding to the second type may be used not only for an MBMS service but also for unicast transmission. Therefore, in the second type, it may be indicated whether each subframe is used for MBSFN transmission or for unicast transmission. Specifically, the second type may have a flag indicating whether each subframe is used for MBSFN transmission or for unicast transmission. According to one embodiment, an MBMS cell corresponding to the second type may be an FeMBMS/unicast-mixed cell of Release 14. In the FeMBMS/unicast-mixed cell, MBSFN transmission or unicast transmission can be supported over an FeMBMS frequency.

Any subframe corresponding to the third type may be allocated for MBSFN transmission. Specifically, any subframe corresponding to the third type is configured to support an MBMS service and does not support unicast transmission. An MBMS cell corresponding to the third type may be an MBMS-dedicated cell supporting FeMBMS.

According to one embodiment, the third type may employ not only subframes 1, 2, 3, 6, 7, and 8 but also subframes 4 and 9 among the ten subframes, and these frames may be configured to be used only for MBSFN transmission. In this case, an FeMBMS frequency may be supported in the MBMS-dedicated cell. According to another embodiment, in the third type, subframes 1, 2, 3, 6, 7, and 8 among the ten subframes may be configured to be used only for MBSFN transmission, and subframes 4 and 9 may be configured not to be used as MBSFN subframes. In this case, the FeMBMS frequency cannot be supported in the MBMS-dedicated cell.

The MBMS service frequency type indicator may be provided from the network to the UE via MBMS service continuity information (SIB15). In SIB15, an MBMS SAI may be mapped to frequency information on a plurality of MBMS services. The frequency information on the MBMS services may include an MBMS frequency type indicator and a carrier frequency.

Table 3 illustrates elements of SIB 15 according to one embodiment of the present invention.

TABLE 3

```
-- ASN1START
SystemInformationBlockType15-r11 ::=SEQUENCE{
    mbms-SAI-IntraFreq-r11           MBMS-SAI-List-r11                    OPTIONAL, -- Need OR
    mbms-SAI-InterFreqList-r11       MBMS-SAI-InterFreqList-r11           OPTIONAL, -- Need OR
    laterNonCriticalExtension        OCTET STRING                         OPTIONAL,
    ...,
    [{  mbms-SAI-InterFreqList-v1140 MBMS-SAI-InterFreqList-v1140OPTIONAL-Cond InterFreq
    ]},
    [{  mbms-IntraFreqCarrierType-r14     MBMS-CarrierType-r14            OPTIONAL,
        mbms-InterFreqCarrierTypeList-r14 MSMS-InterFreqCarrierTypeList-r14 OPTIONAL
    }]
}
MBMS-SAI-List-r11 ::=              SEQUENCE (SIZE (1..maxSAI-MBMS-r11)) OF MBMS-SAI-r11
MBMS-SAI-r11 ::=                INTEGER (0..65535)
MBMS-SAI-InterFreqList-r11 ::=     SEQUENCE (SIZE (1..maxFreq)) OF MBMS-SAI-InterFreq-r11
MBMS-SAI-InterFreqList-v1140 ::= SEQUENCE (SIZE (1..maxFreq)) OF MBMS-SAI-InterFreq-v1140
MBMS-SAI-InterFreq-r11 ::=         SEQUENCE {
    dl-CarrierFreq-r11                 ARFCN-ValueEUTRA-r9,
    mbms-SAI-List-r11                  MBMS-SAI-List-r11
}
MBMS-SAI-InterFreq-v1140 ::=       SEQUENCE {
    multiBandInfoList-r11              MultiBandInfoList-r11            OPTIONAL-- Need OR
}
MBMS-InterFreqCarrierTypeList-r14 ::= SEQUENCE (SIZE (1..maxFreq)) OF MBMS-CarrierType-r14
MBMS-CarrierType-r14 ::=           CHOICE {
    mbms-CarrierFreq-r14               NULL,
    fembms-CarrierFreq-r14         FEMBMS-CarrierFreq-r14
}
FEMBMS-CarrierFreq-r14 ::=         SEQUENCE {
    frameOffset-r14                    INTEGER (0..3),
    framePeriod-r14                    ENUMERATED {n1, n4}              OPTIONAL    -- Need OR
}
-- ASN1STOP
```

In Table 3, femnbms-CarrierFreq needs to be set to 0 in the presence of only framneOffset and indicates that a carrier is an FeMBMS carrier. When both values are present, framneOffset provides a radio frame including a PBCH by SFN mod framePeriod=frameOffset. As the value of framePeriod, n1 represents 1, and n4 represents 4. mbms-CarrierType indicates whether the carrier is a Pre-Rel-14 MBMS carrier or an FeMBMS carrier. Further, mbms-InterFreqCarrierTypeList includes a list indicating whether a contiguous frequency is a Pre-Rel-14 MBMS carrier or an FeMBMS carrier. mbms-IntraFreqCarrierType indicates whether the carrier is a Pre-Rel-14 MBMS carrier or an FeMBMS carrier. According to the present embodiment, mbms-CarrierType in Table 3 may be an MBMS frequency type indicator.

The UE may receive the MBMS service through the MBMS frequency indicated by the received MBMS frequency type indicator. Specifically, the UE may identify the type of the MBMS frequency for the MBMS service of interest through the received MBMS frequency type indicator and may receive the MBMS service through the MBMS frequency corresponding to the type.

According to one embodiment, when the MBMS frequency indicated by the received MBMS frequency type indicator is a frequency supported by the UE, the UE can receive the MBMS service on the MBMS frequency. Specifically, after receiving the MBMS frequency type indicator, the UE may determine whether the UE supports the type of the MBMS frequency indicated by the received MBMS frequency type indicator (supportedMBMSfrequencyType) (S1120). That is, the UE may determine whether the UE supports the type of the MBMS frequency based on capability thereof.

In one example, when the received MBMS frequency type indicator indicates that the MBMS frequency corresponds to an FeMBMS frequency, the UE not supporting the FeMBMS frequency may not camp on an MBMS cell (FeMBMS/unicast-mixed cell) corresponding to the MBMS frequency type indicator. In addition, when the received MBMS frequency type indicator indicates that the MBMS frequency does not correspond to an FeMBMS frequency, the UEs not supporting the FeMBMS frequency may not camp on an MBMS cell (e.g., MBMS-dedicated call or MBMS/unicast-mixed cell) corresponding to the MBMS frequency type indicator.

In another example, when the received MBMS frequency type indicator indicates the first type, the UE may determine whether the UE supports an MBMS frequency corresponding to the first type. According to one embodiment, the UE may support the MBMS frequency corresponding to the first type. When the UE supports the MBMS frequency corresponding to the first type, the UE may consider the MBMS frequency corresponding to the first type as a part of MBMS frequencies of interest and may receive the MBMS service through the MBMS frequency.

When the received MBMS frequency type indicator indicates the second type, the UE may determine whether the UE supports an MBMS frequency corresponding to the second type. According to one embodiment, the UE may not support the MBMS frequency corresponding to the second type. When the UE does not support the MBMS frequency corresponding to the second type, the UE may not consider the MBMS frequency corresponding to the second type as an MBMS frequency of interest. That is, the UE may determine that the UE cannot receive the MBMS service through the MBMS frequency corresponding to the second type and may exclude the frequency corresponding to the second type from the MBMS frequency of interest.

When the received MBMS frequency type indicator indicates the third type, the UE may determine whether the UE supports a frequency corresponding to the third type. According to one embodiment, the UE may not support the MBMS frequency corresponding to the third type.

The UE may acquire the type of the MBMS frequency for the MBMS service of interest by explicitly receiving the MBMS frequency type indicator from the network, but the present invention is not limited thereto. The UE may receive a configuration about an MBSFN subframe of the MBMS service of interest, thereby implicating the type of the MBMS frequency. The MBSFN subframe is a subframe for transmitting a physical multicast channel (PMCH), in which a CRS (common reference signal or cell-specific reference signal) may not be transmitted a region other than a PDCCH region including the first two OFDM symbols. Here, the CRS denotes a reference signal that can be recognized by all UEs in a cell. The UE can acquire the configuration about the MBSFN subframe through SIB2. For example, when subframes 0, 4, 5, and 9 are not configured, the UE may determine that the MBMS frequency is the first type. When subframes 0, 4, 5, and 9 are configured, the UE may determine that the MBMS frequency is the second type. When all of the ten subframes are configured or SIB2 is not provided, the UE may determine that the MBMS frequency is the third type.

When it is determined that the MBMS frequency corresponding to the received MBMS frequency type indicator is supported by the UE, the UE may consider the frequency as an MBMS frequency of interest (S1130).

When there is an MBMS frequency considered as an MBMS frequency of interest, the UE may receive the MBMS service through the MBMS frequency (S1140). When there is no MBMS frequency considered as a frequency of interest, the UE may receive another MBMS frequency type indicator for the MBMS service of interest and may repeat the procedure described above.

Although the embodiments of the present invention show that the type of an MBMS frequency is acquired in order to receive an MBMS service, the present invention is not limited thereto. It is noted that the type of an MBMS frequency is also considered in setting priorities for MBMS frequency reselection.

Figure 12:
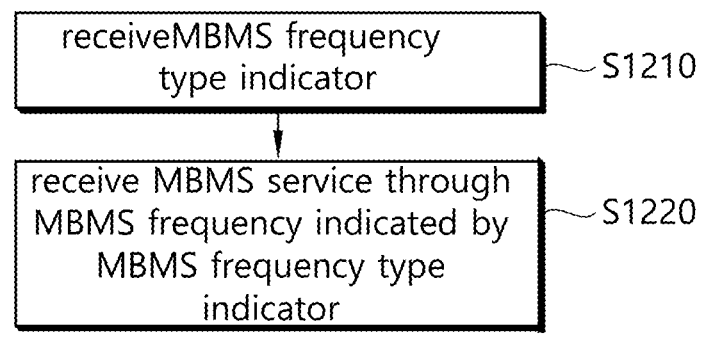
FIG. 12 is a flowchart illustrating a method for receiving an MBMS service according to an embodiment of the present invention.

FIG. 12 is a flowchart illustrating a method 1200 for receiving an MBMS service according to an embodiment of the present invention.

As shown in FIG. 12, a UE according to the embodiment of the present invention may receive an MBMS frequency type indicator for an MBMS service of interest from a network (S1210). According to one embodiment, the MBMS frequency type indicator may indicate whether a frequency corresponds to an FeMBMS frequency. In addition, the MBMS frequency type indicator may indicate one of a first type, a second type, and a third type, wherein the second type may be a type supporting the FeMBMS frequency. The first type may correspond to a combination of one or more subframes of subframes 1, 2, 3, 6, 7, and 8. The second type may correspond to a subframe combination including a subframe other than subframes 1, 2, 3, 6, 7, and 8 among the ten subframes. The second type may include a subframe supporting not only MBSFN transmission but also unicast transmission. In this case, in the second type, it may be indicated whether each subframe is used for MBSFN transmission or for unicast transmission. In the third type, subframes included in the third type may be allocated only for MBSFN transmission. The MBMS frequency type indicator may be provided to the UE via SIB 15.

Next, the UE may receive an MBMS service through an MBMS frequency indicated by the MBMS frequency type indicator (S1220). The UE may receive the MBMS frequency type indicator and may determine whether the UE supports the MBMS frequency indicated by the received MBMS frequency type indicator. Specifically, the UE may receive the MBMS service through the MBMS frequency indicated by the MBMS frequency type indicator on an MBMS cell corresponding to the MBMS frequency type indicator. Here, the MBMS cell may be an MBMS/unicast-mixed cell, an FeMBMS/unicast-mixed cell, or an MBMS-dedicated cell. When the UE supports the MBMS frequency indicated by the received MBMS frequency type indicator, the UE may consider the MBMS frequency as a part of MBMS frequencies of interest. When there is an MBMS frequency considered as a part of the MBMS frequencies of interest, the UE may receive the MBMS service using the MBMS frequency.

According to an embodiment of the present invention, the MBMS interest indication procedure may further include determining whether the MBMS frequency type is included in supportedMBMSFrequencyType included in UE-EUTRA-capability. That is, the UE according to the embodiment of the present invention may consider an MBMS frequency as a part of the MBMS frequencies of interest only when the MBMS frequency included in SIB 15 is supported by the UE.

Figure 13:
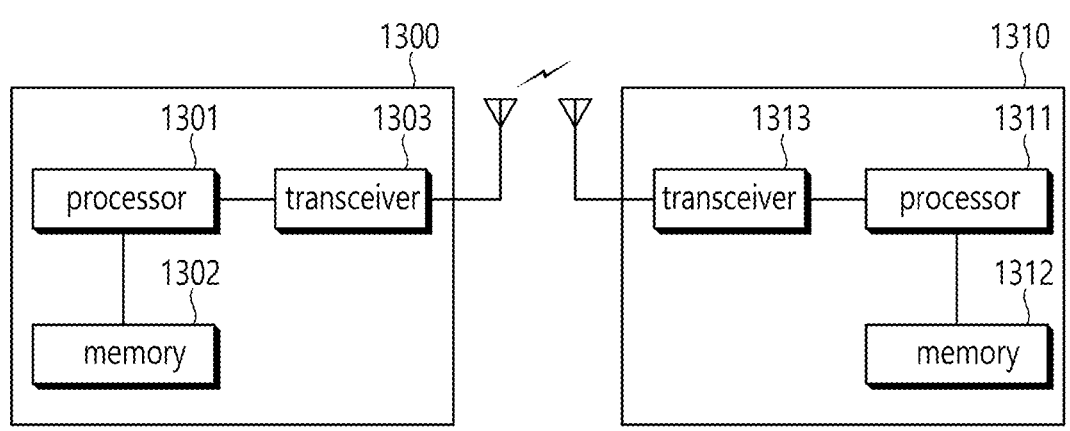
FIG. 13 shows a wireless communication system to implement an embodiment of the present invention.

FIG. 13 is a block diagram illustrating a wireless apparatus in which an embodiment of the present invention can be implemented.

A BS 1300 includes a processor 1301, a memory 1302, and a radio frequency (RF) unit 1303. The memory 1302 is coupled to the processor 1301, and stores a variety of information for driving the processor 1301. The RF unit 1303 is coupled to the processor 1301, and transmits and/or receives a radio signal. The processor 1301 implements the proposed functions, procedures, and/or methods. In the aforementioned embodiments, an operation of the BS may be implemented by the processor 1301.

A UE 1310 includes a processor 1311, a memory 1312, and an RF unit 1313. The memory 1312 is coupled to the processor 1311, and stores a variety of information for driving the processor 1311. The RF unit 1313 is coupled to the processor 1311, and transmits and/or receives a radio signal. The processor 61 implements the proposed functions, procedures, and/or methods. In the aforementioned embodiments, an operation of the UE 1310 may be implemented by the processor 1311.

The processors 1311 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for receiving, by a user equipment (UE), a multimedia broadcast multicast service (MBMS) service in a wireless communication system, the method comprising:
receiving, from a network through System Information Block 15 (SIB15), an MBMS frequency type indicator informing that a type of a certain MBMS frequency related to the MBMS service is a third type among a first type, a second type, and the third type;
determining whether the type of the certain MBMS frequency indicated by the received MBMS frequency type indicator is supported by the UE;
considering the certain MBMS frequency to be part of MBMS frequencies of interest based on a determination that the type of the certain MBMS frequency is supported by the UE;
transmitting, to the network, an MBMS interest indication informing the MBMS frequencies of interest; and
receiving, from the network, the MBMS service by multicast broadcast single frequency network (MBSFN) transmission via the certain MBMS frequency based on the MBMS frequency type indicator in response to the MBMS interest indication,
wherein the first type of the MBMS frequency defines first subframes #1, #2, #3, #6, #7, and #8 in a radio frame for the MBSFN transmission, and the MBSFN transmission via the first type is performed by at least one subframe among the first subframes,
wherein the second type of the MBMS frequency defines second subframes, other than the first subframes #1, #2, #3, #6, #7, and #8 in the radio frame for the MBSFN transmission, and the MBSFN transmission via the second type is performed by at least one subframe among the first subframes and the second subframes,
wherein the third type of the MBMS frequency denotes that all subframes in the radio frame are configured for the MBSFN transmission, and the MBSFN transmission via the third type is performed by at least one subframe of all the subframes,
wherein subframes are indexed in the radio frame starting from subframe #0, and
wherein the third type of the MBMS frequency is on an MBMS-dedicated cell.

2. The method of claim 1, wherein the first type of the MBMS frequency is on an MBMS/unicast-mixed cell, which performs MBSFN transmission and/or unicast transmission.

3. The method of claim 1, wherein the second type of the MBMS frequency is on a further enhanced MBMS (FeMBMS)/unicast-mixed cell, which performs MBSFN transmission and/or unicast transmission.

4. The method of claim 3, wherein in the FeMBMS/unicast-mixed cell, an indication is provided indicating whether each subframe in the radio frame is used for the MBSFN transmission or the unicast transmission.

5. The method of claim 1, wherein the second subframes include subframes #4 and #9 in the radio frame for the MBSFN.

6. A user equipment (UE) configured to receive a multimedia broadcast multicast service (MBMS) service in a wireless communication system, the UE comprising:
- a memory;
- a transceiver; and
- a processor operatively coupled to the memory and the transceiver, and configured to:
- receive, from a network through System Information Block 15 (SIB15), an MBMS frequency type indicator informing that a type of a certain MBMS frequency related to the MBMS service is a third type among a first type, a second type, and the third type; and
- determine whether the type of the certain MBMS frequency indicated by the received MBMS frequency type indicator is supported by the UE;
- consider the certain MBMS frequency to be part of MBMS frequencies of interest based on a determination that the type of the certain MBMS frequency is supported by the UE;
- transmit, to the network, an MBMS interest indication informing the MBMS frequencies of interest; and
- receive, from the network, the MBMS service by multicast broadcast single frequency network (MBSFN) transmission via the certain MBMS frequency based on the MBMS frequency type indicator in response to the MBMS interest indication, wherein the first type of the MBMS frequency defines first subframes #1, #2, #3, #6, #7, and #8 in a radio frame for the MBSFN transmission, and the MBSFN transmission via the first type is performed by at least one subframe among the first subframes, wherein the second type of the MBMS frequency defines second subframes, other than the first subframes #1, #2, #3, #6, #7, and #8 in the radio frame for the MBSFN transmission, and the MBSFN transmission via the second type is performed by at least one subframe among the first subframes and the second subframes, wherein the third type of the MBMS frequency denotes that all subframes in the radio frame are configured for the MBSFN transmission, and the MBSFN transmission via the third type is performed by at least one subframe of all the subframes, wherein subframes are indexed in the radio frame starting from subframe #0, and wherein the third type of the MBMS frequency is on an MBMS-dedicated cell.

* * * * *